US008488807B2

(12) United States Patent
Chiba et al.

(10) Patent No.: US 8,488,807 B2
(45) Date of Patent: Jul. 16, 2013

(54) AUDIO SIGNAL COMPENSATION DEVICE AND AUDIO SIGNAL COMPENSATION METHOD

(75) Inventors: Norikatsu Chiba, Suginami-ku (JP); Kimio Miseki, Oume (JP); Yasuhiro Kanishima, Oume (JP); Kazuyuki Saito, Hamura (JP); Toshifumi Yamamoto, Hino (JP); Takashi Fukuda, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 12/963,475

(22) Filed: Dec. 8, 2010

(65) Prior Publication Data

US 2011/0158427 A1 Jun. 30, 2011

(30) Foreign Application Priority Data

Dec. 24, 2009 (JP) ................................ 2009-292412

(51) Int. Cl.
*H04B 15/00* (2006.01)

(52) U.S. Cl.
USPC ....... 381/94.1; 381/94.2; 381/71.6; 381/71.1; 381/71.14; 381/317; 381/320; 381/321; 381/93; 600/559; 181/126; 181/130

(58) Field of Classification Search
USPC .................. 381/94.1, 94.2, 71.6, 71.1, 71.14, 381/74, 23.1, 317, 320, 321, 93, 83; 600/559; 181/126, 130
See application file for complete search history.

(56) References Cited

U.S. PATENT DOCUMENTS

| | | | | |
|---|---|---|---|---|
| 4,807,612 | A * | 2/1989 | Carlson | 128/868 |
| 5,068,901 | A * | 11/1991 | Carlson | 381/325 |
| 7,010,136 | B1 * | 3/2006 | Roberts et al. | 381/320 |

(Continued)

FOREIGN PATENT DOCUMENTS

| | | | |
|---|---|---|---|
| JP | 05-252598 | | 9/1993 |
| JP | 05252598 | A * | 9/1993 |

(Continued)

OTHER PUBLICATIONS

Allen et al, A second cochlear frequency map that correlates distortion product and neural tuning measurements, Mar. 19, 1993.*

(Continued)

*Primary Examiner* — Davetta W Goins
*Assistant Examiner* — Kuassi Ganmavo
(74) *Attorney, Agent, or Firm* — Blakely, Sokoloff, Taylor & Zafman LLP

(57) ABSTRACT

An audio signal compensation device includes: a signal processor configured to perform filtering on an input audio signal; a filter coefficients storage module configured to store a plurality of filter coefficients; a user interface configured to provide options for a determination of filter coefficients to a user and to obtain a selection result from the user; and a filter coefficients determining module configured to determine a set of filter coefficients among the plurality of filter coefficients based on the selection result. The options for the determination of filter coefficients are produced by selecting a first filter coefficient and a second filter coefficient from the plurality of filter coefficients, the first filter coefficient corresponding to a first characteristic quantity of external auditory canal characteristics, the second filter coefficient corresponding to a second characteristic quantity of the external auditory canal characteristics which is predicted based on the first characteristic quantity.

10 Claims, 8 Drawing Sheets

U.S. PATENT DOCUMENTS

| | | | | |
|---|---|---|---|---|
| 7,756,281 | B2 * | 7/2010 | Goldstein et al. | 381/309 |
| 8,081,769 | B2 * | 12/2011 | Fukuda et al. | 381/71.6 |
| 8,135,139 | B2 * | 3/2012 | Neher et al. | 381/60 |
| 2004/0196991 | A1 * | 10/2004 | Iida et al. | 381/309 |
| 2008/0260193 | A1 | 10/2008 | Westermann et al. | |
| 2009/0208027 | A1 | 8/2009 | Fukuda et al. | |
| 2009/0296949 | A1 | 12/2009 | Iwata et al. | |
| 2009/0316944 | A1 * | 12/2009 | Tiscareno et al. | 381/346 |
| 2010/0142726 | A1 | 6/2010 | Donaldson | |
| 2010/0177910 | A1 * | 7/2010 | Watanabe | 381/94.1 |

FOREIGN PATENT DOCUMENTS

| | | |
|---|---|---|
| JP | H5-252598 | 9/1993 |
| JP | H8-111899 | 4/1996 |
| JP | 2007-110536 | 4/2007 |
| JP | 2009-512373 | 3/2009 |
| JP | 2009-516409 | 4/2009 |
| JP | 2009-194769 | 8/2009 |
| JP | 2009-288555 | 12/2009 |
| WO | WO 0001196 A1 * | 1/2000 |

OTHER PUBLICATIONS

Ciric et al, Coupling of earphones to human ears and to statndard coupler, Acoustical Society of America, 2006.*

Japanese Patent Application No. 2009-292412; Notice of Reasons for Rejection; Mailed Apr. 19, 2011 (English translation).

Japanese Patent Application No. 2009-292412; Notice of Reasons for Rejection; Mailed Sep. 6, 2011 (English translation).

* cited by examiner

AUDIO SIGNAL COMPENSATION DEVICE AND AUDIO SIGNAL COMPENSATION METHOD

CROSS REFERENCE TO RELATED APPLICATION(S)

The present disclosure relates to the subject matters contained in Japanese Patent Application No. 2009-292412 filed on Dec. 24, 2009, which are incorporated herein by reference in its entirety.

FIELD

Embodiments, described herein relate generally to an audio signal compensation device and an audio signal compensation method.

BACKGROUND

A muffled sound is heard by a person who is wearing earphones because his or her external auditory canals are closed by the earphones. This phenomenon is caused by a resonance in the external auditory canals that are closed by the earphones.

JP-A-2007-110536 discloses a technique relating to a configuration of noise canceling headphones. In the noise canceling headphones, multiple filter characteristics having different frequency pass-bands are stored in advance for noise cancellation. An arbitrary one of the multiple filter characteristics is selected by an external operation and set as a filter characteristic of a digital filter.

JP-A-H5-252598 discloses a technique of selecting a proper head-related transfer function (HRTF) by causing a user to hear many sample sounds with each of his or her left and right ears. JP-A-H8-111899 discloses a technique that relates to hardware for solving a problem of JP-A-H5-252598.

However, in the function of selecting one of multiple settings, no highly convenient method has been disclosed which utilizes a relationship between characteristics of the external auditory canal(s).

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION

In general, according to one embodiment, an audio signal compensation device includes: a signal processor configured to perform filtering on an input audio signal; a filter coefficients storage module configured to store a plurality of filter coefficients; a user interface configured to provide options for a determination of filter coefficients to a user and to obtain a selection result from the user; and a filter coefficients determining module configured to determine a set of filter coefficients among the plurality of filter coefficients based on the selection result. The options for the determination of filter coefficients are produced by selecting a first filter coefficient and a second filter coefficient from the plurality of filter coefficients, the first filter coefficient corresponding to a first characteristic quantity of external auditory canal characteristics, the second filter coefficient corresponding to a second characteristic quantity of the external auditory canal characteristics which is predicted based on the first characteristic quantity.

Embodiments of the present invention will be hereinafter described.

First Embodiment

A first embodiment of the present invention will be described below with reference to FIGS. 1-8.

Figure 2:
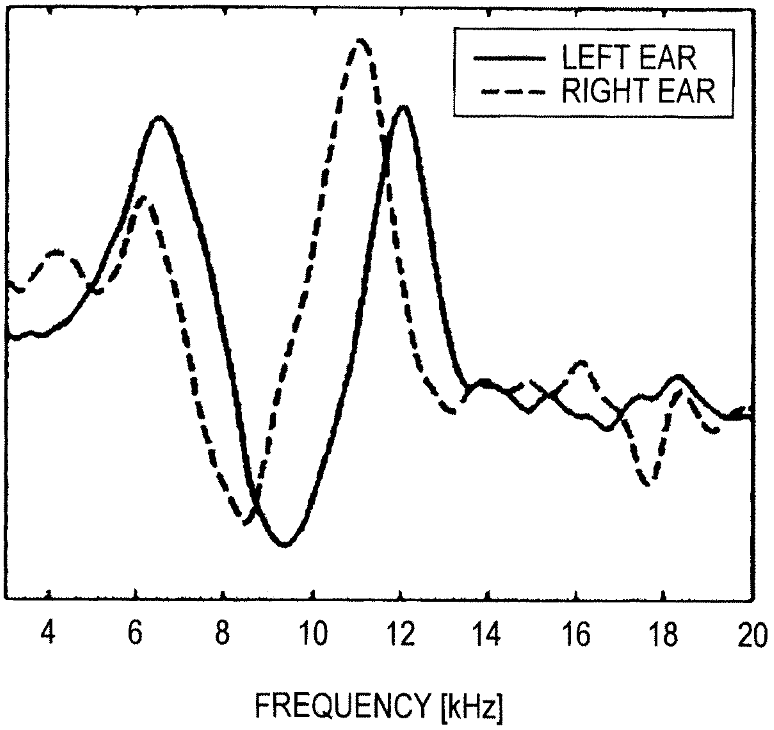
FIG. 2 is a graph showing acoustic characteristics of external auditory canals obtained by an experiment.

In the related art, a muffled sound is heard by a person who is wearing earphones because his or her external auditory canals are closed by the earphones. This phenomenon is caused by the resonance in the external auditory canals that are closed by the earphones. FIG. 2 shows acoustic characteristics of the external auditory canals, closed by earphones, of a certain test subject. These acoustic characteristics were obtained by microphones that were set near opening ends of the earphone bodies. A horizontal axis represents a frequency and a vertical axis represents a gain. For each of the left and right ears, a first peak (hereinafter referred to as first-order resonance) is located at a frequency that is a little higher than 6 kHz. The next peak (hereinafter referred to as second-order resonance) is located at a frequency that is a little higher than 10 kHz. It is seen that the frequencies of the first-order resonance (hereinafter referred to as first-order resonance frequencies) of the left ear and the right ear are different from each other and the frequencies of the second-order resonance (hereinafter referred to as second-order resonance frequencies) of the left ear and the right ear are also different from each other.

Figure 3:
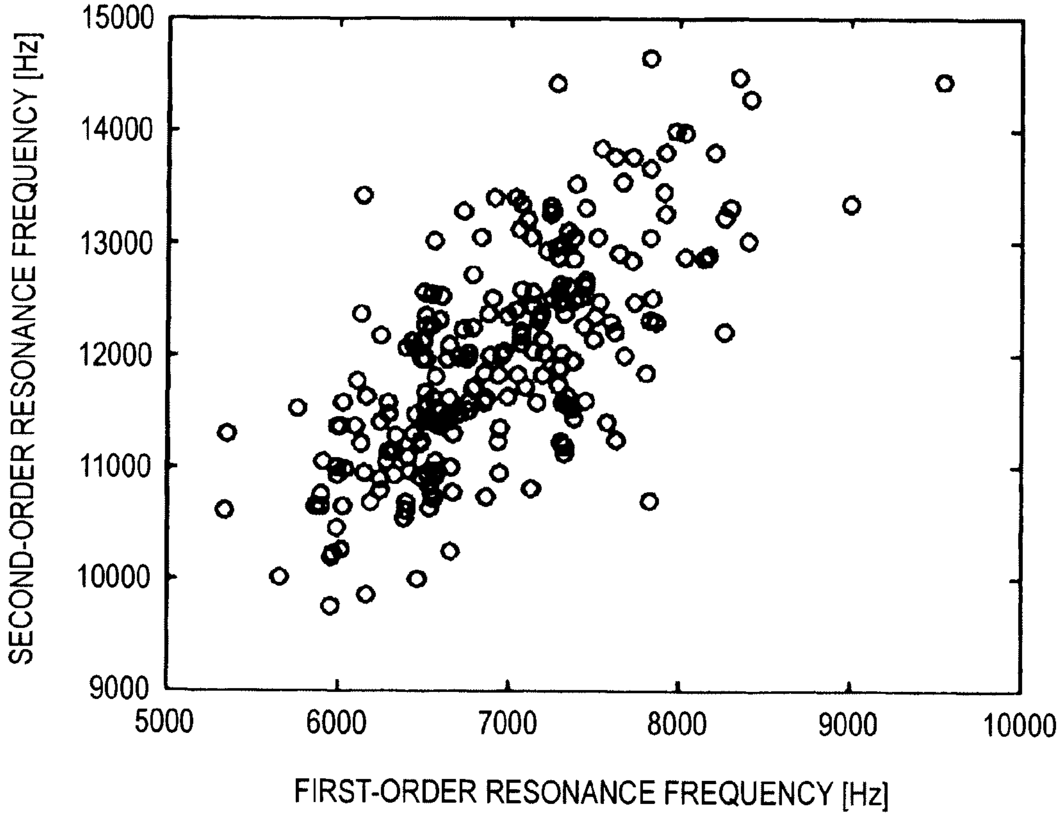
FIG. 3 is a graph showing a distribution of pairs of resonance frequencies in a state that an earphone is inserted in a left ear.
Figure 4:
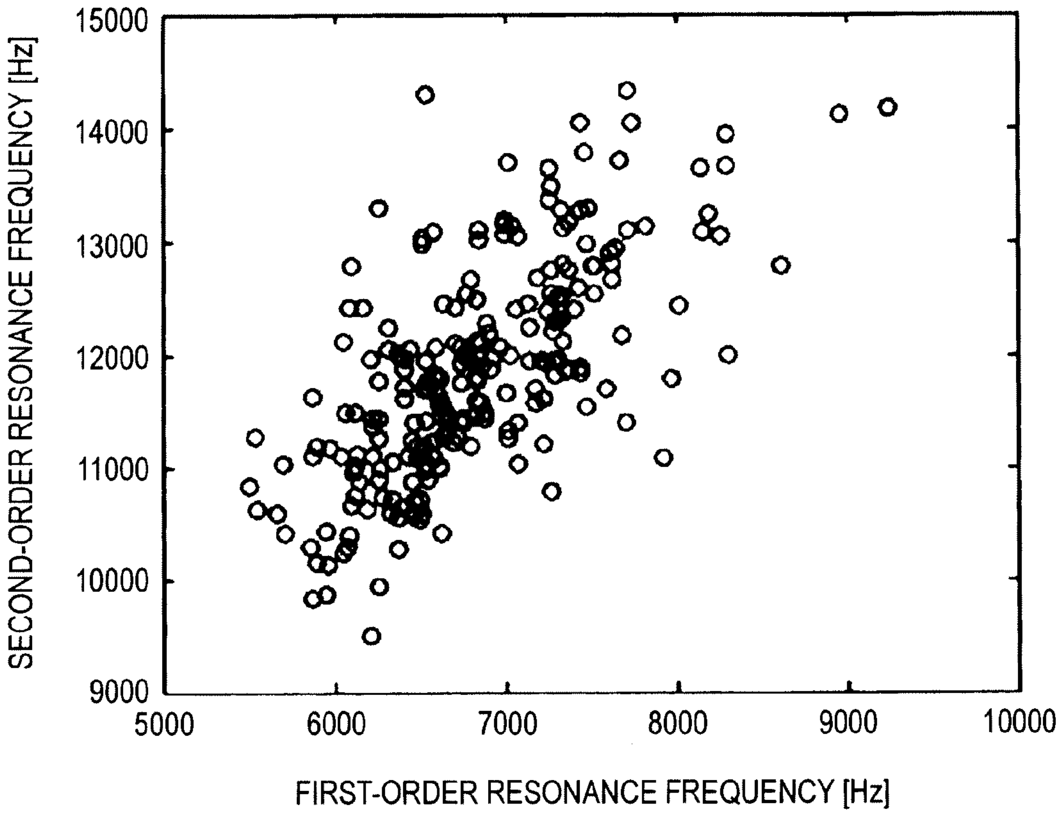
FIG. 4 is a graph showing a distribution of pairs of resonance frequencies in a state that an earphone is inserted in a right ear.

FIG. 3 shows a distribution of pairs of a first-order resonance frequency and a second-order resonance frequency of the left ears of multiple test subjects that were obtained under the same conditions as the characteristics of FIG. 2 were obtained. FIG. 4 shows a distribution of pairs of a first-order resonance frequency and a second-order resonance frequency of the right ears of the same, multiple test subjects. It is seen that the first-order resonance frequency, for example, varies form one person to another in the range of about 5.5 kHz to over 9 kHz.

JP-A-5-252598 discloses a technique relating to an extra-head sound orientation headphone auditory device. In JP-A-5-252598, it can be solved that a person feels bottled up when wearing headphones. The number of necessary filter coefficients effectively is decreased by clustering different transfer functions of respective individuals, and to thereby reduce the time and labor of making settings for a listener. However, the determination of proper filter coefficients requires at least 16 listening attempts.

In view of the above, JP-A-8-111899 discloses a separate technique for reducing the time and labor of making settings for a listener by estimating proper filter coefficients based on measurement data obtained by a means for measuring a shape of a head that is wearing headphones. However, since hardware for measuring a shape is necessary, the hardware implementation cost is high. Therefore, such headphones are not common.

The first embodiment relates to a technique that makes it possible to easily implement an acoustic device capable of solving the phenomenon that a sound is muffled during listening using earphones.

The first embodiment is based on the following technique of JP-A-2009-194769. Resonance frequencies of the external auditory canals of a listener are measured and an acoustic correction is performed based on measurement results, whereby the listener is prevented from hearing a muffled sound. However, the hardware implementation cost is high because it requires hardware for measurement. Further, general people have difficulty acquiring such hardware.

First, a description will be made of the reason why the technique of JP-A-2009-194769 can be implemented by an easier method. The measurement results of FIGS. 3 and 4 show that first-order resonance frequencies are distributed approximately in the range of 5 to 9 kHz and second-order resonance frequencies are distributed approximately in the range of 10 to 14 kHz.

On the other hand, it is known that the frequency resolution to be perceived or perceivable by human beings becomes lower as the frequency increases. Therefore, in generating filter coefficients for lowering the peaks at the first-order resonance frequency and the second-order resonance frequency, it would not be necessary to set the center frequency of the filter strictly in connection with a resonance frequency. To confirm this notion, we conducted listening experiments by a paired comparison method in which the auditory feel with strict setting of the center frequency was compared with that with each case that the center frequency was deviated from a resonance frequency by about 500 Hz upward or downward. The experiments showed that no difference was found in sound quality between the two kinds of settings. In a second-order resonance frequency band, a sufficient acoustic correction can be performed by setting the center frequency with even lower accuracy. Consequently, as for the suppression of the first-order resonance, a sufficient correction can be performed by preparing, for example, five kinds of filters whose center frequencies range from 5 kHz to 9 kHz with an interval of 1 kHz. As for the suppression of the second-order resonance, the center frequencies of filters can be set with even lower accuracy.

It is seen from FIGS. 3 and 4 that a strong positive correlation exists between the first-order resonance frequency and the second-order resonance frequency even though the resonance frequencies vary greatly from one person to another. Therefore, the second-order resonance frequency increases as the first-order resonance frequency increases. Paying attention to this phenomenon can reduce the number of sets of filter coefficients for suppressing both of the first-order resonance and the second-order resonance. For example, it is seen from FIG. 3 that in the case of a person having first-order resonance at 7 kHz, second-order resonance occurs at about 12 kHz. For that person, almost no resonance phenomena occur in frequency ranges that are lower than 10 kHz and higher than 13 kHz, respectively. To suppress the second-order resonance, it is sufficient to prepare three kinds of filters whose center frequencies are in the range of 11 to 13 kHz. Taking into consideration the poor frequency resolution of the listening in the high frequency band, it is sufficient to prepare a resonance suppression filter for suppressing resonance only at 12 kHz, for example.

In conclusion, the kinds of resonance suppression filters can be made smaller in number than described in JP-A-2009-194769, to a few. It is possible to determine a resonance suppression filter suitable for a listener by causing the listener to actually listen to sounds that are produced through a few kinds of filters. No special hardware for measurement is thus necessary.

Figure 1:
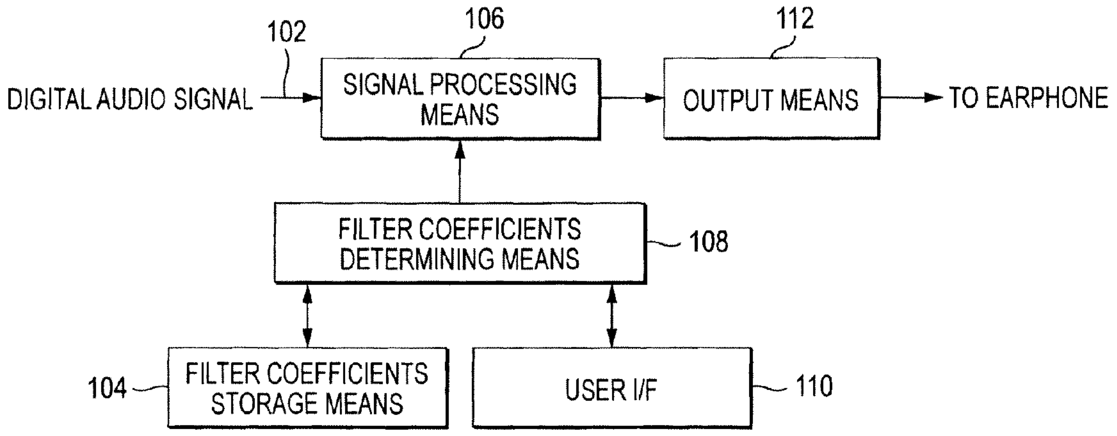
FIG. 1 is a block diagram showing an audio signal compensation device according to a first embodiment of the present invention.

FIG. 1 is a block diagram showing an audio signal compensation device according to the first embodiment of the invention. The audio signal compensation device is provided with a filter coefficients storage means 104, a signal processing means 106, a filter coefficients determining means 108, a user I/F 110, an output means 112, etc.

The signal processing means 106, which is a digital filter, performs digital signal processing on an input digital audio signal 102. An output of the signal processing means 106 is supplied to the output means 112. Where the output destination of the output means 112 is a device such as an earphone having an analog input terminal, the output means 112 performs digital-to-analog conversion and an analog electrical signal is output to that device (earphone). Where the output means 112 is connected to an audio device having a digital input terminal, digital data itself is output to the connected audio device in the form of an electrical signal or an optical signal.

The filter coefficients storage means 104 is stored with multiple filter coefficients for suppressing a first-order resonance phenomenon and a higher-order resonance phenomenon than the first-order one such as second-order resonance phenomenon. For example, if each filter is of an Nth order and filter coefficients for suppressing first-order resonance and second-order resonance are to be stored, the total number of filter coefficients stored is $N\times2=2N$.

The filter coefficients storage means 104 is connected to the filter coefficients determining means 108. Filter coefficients that are designated by the filter coefficients determining means 108 are loaded from the filter coefficients storage means 104 to the signal processing means 106.

The user I/F 110 performs processing for providing a user with information for determination of filter coefficients, reception of an intention of the user, and other purposes.

Figure 5:
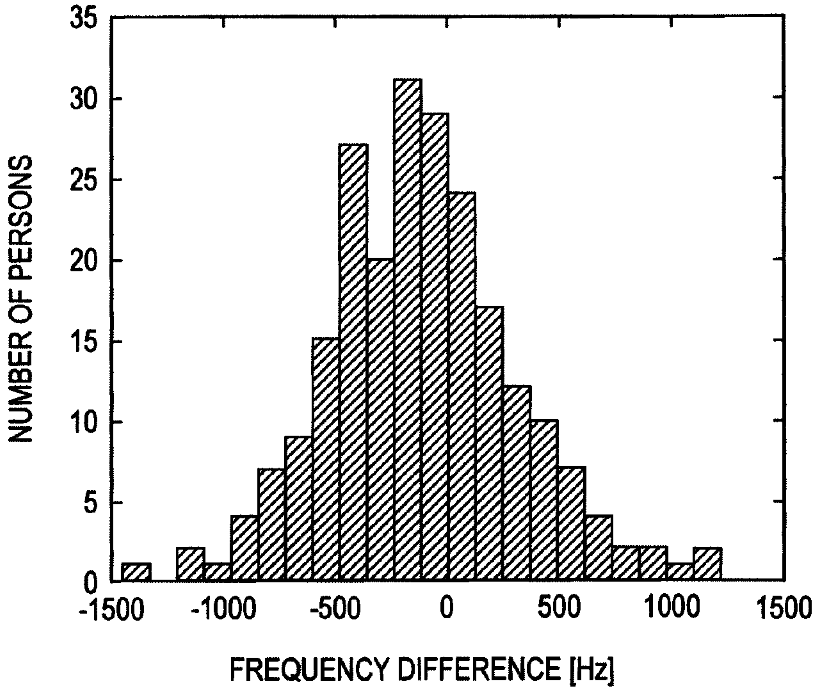
FIG. 5 is a graph showing a distribution of differences between first-order resonance frequencies of the left ear and the right ear.
Figure 6:
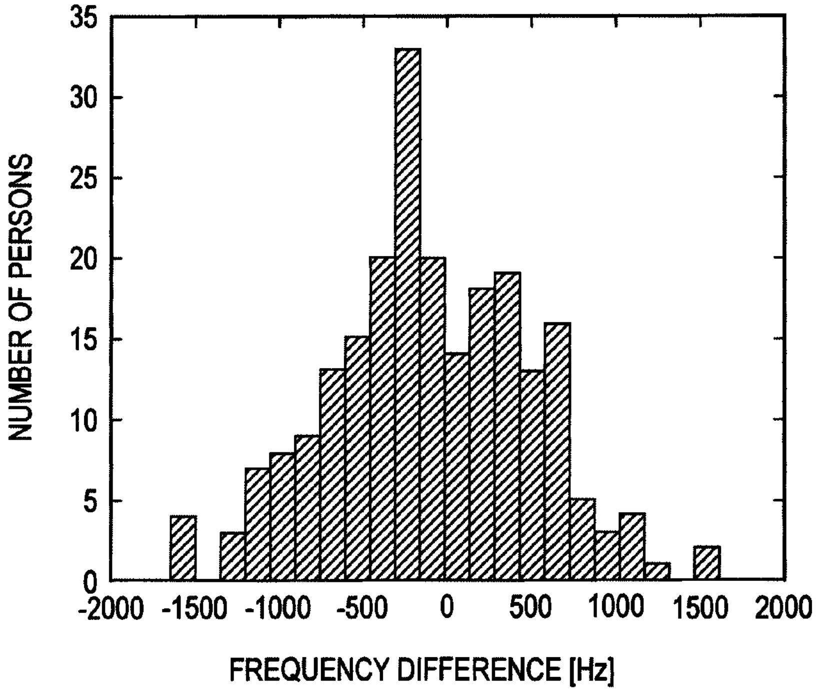
FIG. 6 is a graph showing a distribution of differences between second-order resonance frequencies of the left ear and the right ear.

FIG. 5 is a graph showing a distribution of differences between first-order resonance frequencies of the left ear and the right ear. FIG. 6 is a graph showing a distribution of differences between second-order resonance frequencies of the left ear and the right ear. In each graph, a horizontal axis represents the frequency difference and a vertical axis represents the accumulated number of persons.

For each of the first-order resonance frequency and the second-order resonance frequency, the left ear/right ear differences have a normal distribution. Taking into consideration that the left ear/right ear differences are within a certain range, it can be inferred that, once resonance frequencies are set for the left ear resonance frequencies, the right ear can be set near the left ear frequencies, and vice versa. That is, once resonance frequencies are set for one ear, resonance frequencies for the other ear can be set with less time and labor.

Figure 7:
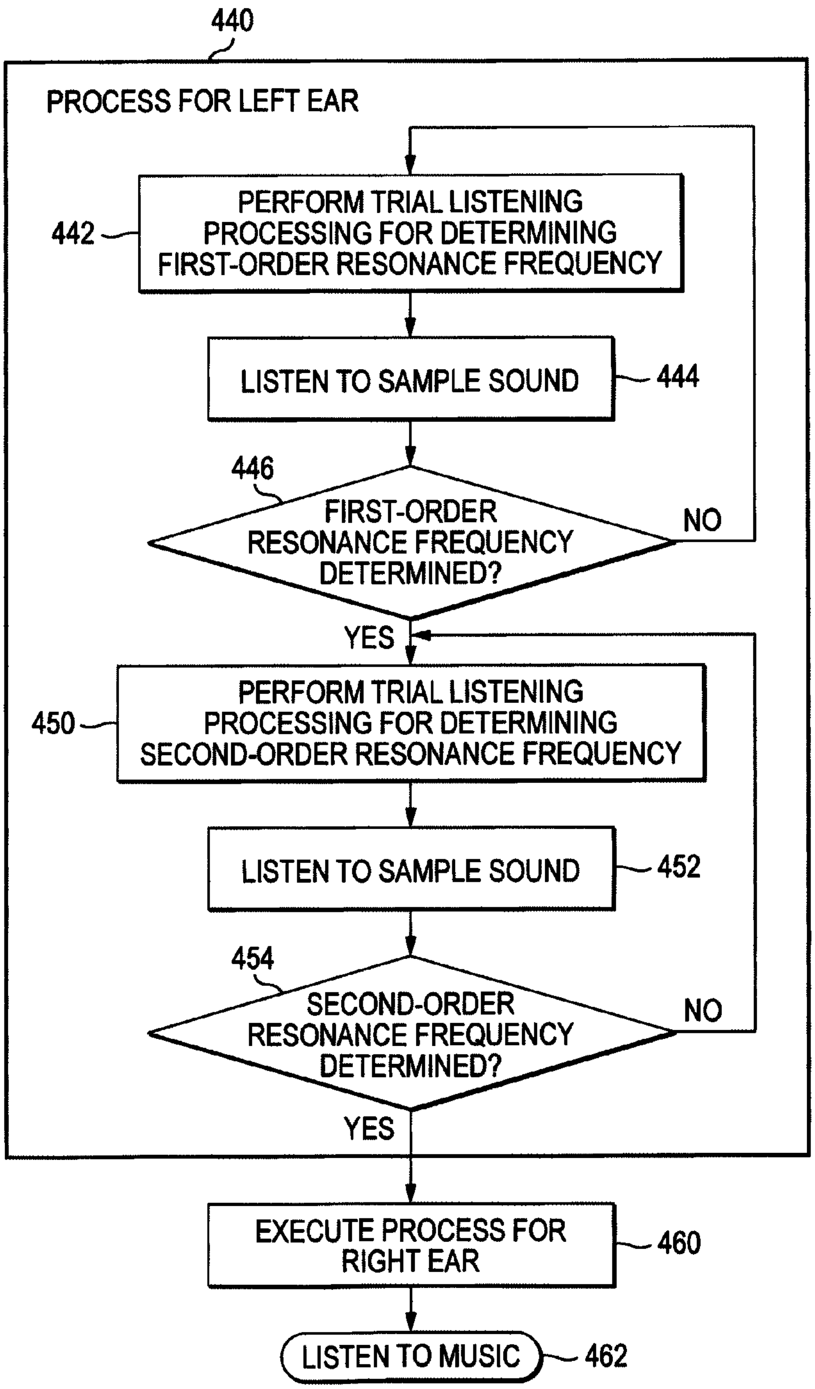
FIG. 7 is a flowchart showing a process that is executed by the audio signal compensation device according to the first embodiment.

FIG. 7 is a flowchart showing a process that is executed by the audio signal compensation device according to the first embodiment. First, to determine a first-order resonance frequency of the left ear, at step 442, the filter coefficients determining means 108 loads filter coefficients for suppressing first-order resonance at 5 kHz from the filter coefficients storage means 104 to the signal processing means 106. The filter coefficients determining means 108 inputs a digital audio signal 102 for trial listening to the signal processing means 106, and causes the output means 112 to output a sample sound. At step 444, the user listens to the sample sound and determines whether or not the correction is suitable for himself or herself. At step 446, a determination result is communicated to the filter coefficients determining means 108 via the user I/F 110. If the filter coefficients are not suitable (step 446: NO), the process returns to step 442, where the filter coefficients determining means 108 loads filter coefficients for suppressing first-order resonance at 6 kHz from the filter coefficients storage means 104 to the signal processing means 106. The same steps are executed repeatedly until filter coefficients that are suitable for suppressing the first-order resonance of the left ear are determined (step 446: YES). Assume here that suitable coefficients are ones for suppressing first-order resonance at 7 kHz.

After the determination of the first-order resonance frequency, in order to determine a second-order resonance frequency of the left ear, at step 450, the filter coefficients determining means 108 loads filter coefficients for suppressing second-order resonance at 12 kHz in addition to the above-determined first-order resonance at 7 kHz from the filter coefficients storage means 104 to the signal processing means 106. This processing is performed taking into consideration that as shown in FIGS. 3 and 4, in the case of listeners having a first-order resonance frequency 7 kHz, second-order resonance frequencies are distributed in a range centered at 12 kHz (11 to 13 kHz). The filter coefficients determining means 108 inputs a digital audio signal 102 for trial listening to the signal processing means 106, and causes the output means 112 to output a sample sound. At step 452, the user listens to the sample sound and determines whether or not the correction is suitable for himself or herself. At step 454, a determination result is communicated to the filter coefficients determining means 108 via the user I/F 110. If the filter coefficients are not suitable (step 454: NO), the process returns to step 450, where the filter coefficients determining means 108 loads filter coefficients for suppressing second-order resonance at 11 kHz instead of the filter coefficients for suppressing second-order resonance at 12 kHz from the filter coefficients storage means 104 to the signal processing means 106. If it is found that the filter coefficients for suppressing second-order resonance at 11 kHz are not suitable either (step 454: NO) after execution of steps 450 and 452, steps 450 and 452 are executed again using filter coefficients for suppressing second-order resonance at 13 kHz instead of the filter coefficients for suppressing second-order resonance at 11 kHz. As such, the same steps are executed repeatedly until filter coefficients that are suitable for suppressing the second-order resonance of the left ear are determined (step 454: YES). Assume here that suitable coefficients are ones for suppressing second-order resonance at 13 kHz.

At step 460, first, a process for determining a first-order resonance frequency of the right ear is executed. The process is the same as for the left ear except that the start frequency is 7 kHz rather than 5 kHz. This process is based on the fact that as shown in FIG. 5 the left ear and right ear first-order resonance frequencies are very close to each other. If 7 kHz is not suitable for the right ear of the user, it is checked whether 6 kHz or 8 kHz, which is close to 7 kHz, is suitable. This procedure eliminates time and labor of causing the user to listen to sample sounds whose frequencies are distant from the first-order resonance frequency of the acoustic characteristics of his or her external auditory canal.

A process for determining a second-order resonance frequency of the right ear is started by determining a first candidate to be presented to the user based on the determined second-order resonance frequency of the left ear and the determined first-order resonance frequency of the right ear. The second-order resonance frequency of the left ear is referred to because as shown in FIG. 6 the difference between the first-order resonance frequencies of the left ear and the right ear is small. In this example, the process for determining a second-order resonance frequency of the right ear is started from 13 kHz. If 13 kHz is not suitable for the right ear of the user, it is checked whether 12 kHz or 11 kHz is suitable. This process is the same as for the left ear. After determination of filter coefficients, at step S462 the user listens to a piece of music.

As described above, the resonance frequency candidates to be presented to a user can be narrowed down by utilizing the facts that the difference between the resonance frequencies of the left ear and the right ear is small and that the first-order resonance frequency and the second-order resonance frequency have a positive correlation. As a result, a user can enjoy high-quality sounds with a small number of times of trial listening without requiring a special hardware device.

Figure 8:
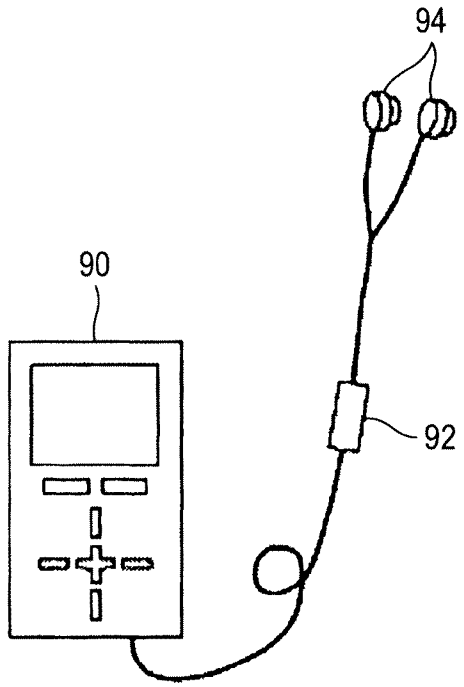
FIG. 8 shows an appearance showing an acoustic device as an application example of the audio signal compensation device according to the first embodiment.

An acoustic device shown in FIG. 8 as an example application of the audio signal compensation device of FIG. 1 will be described below. Where a player 90 incorporates the audio signal compensation device, audio signals that have been subjected to filtering using filter coefficients derived by the filter coefficients determining means 108 are output to earphones or headphones 94. The audio signal compensation device may be incorporated in a remote controller 92 or the earphones or headphones 94. The user I/F 110 deals with an external operation made by the user through the remote controller 92, for example. The acoustic device may be configured in such a manner that a user I/F of the player 90 serves as the user I/F 110.

The acoustic device may be configured in such a manner that a frequency is selected such that sounds having respective frequencies are produced in order and the user presses the enter button of the remote controller 92 with timing of generation of a sound having a suitable frequency. As a further alternative, the acoustic device may be configured in such a manner that a picture for frequency selection is displayed on the player 90 or the remote controller 92 and the user moves the cursor and presses the enter button using the remote controller 92.

Second Embodiment

A second embodiment of the invention will be described below with reference to FIGS. 2-9. Description of a part having the same one in the first embodiment will be omitted.

Figure 9:
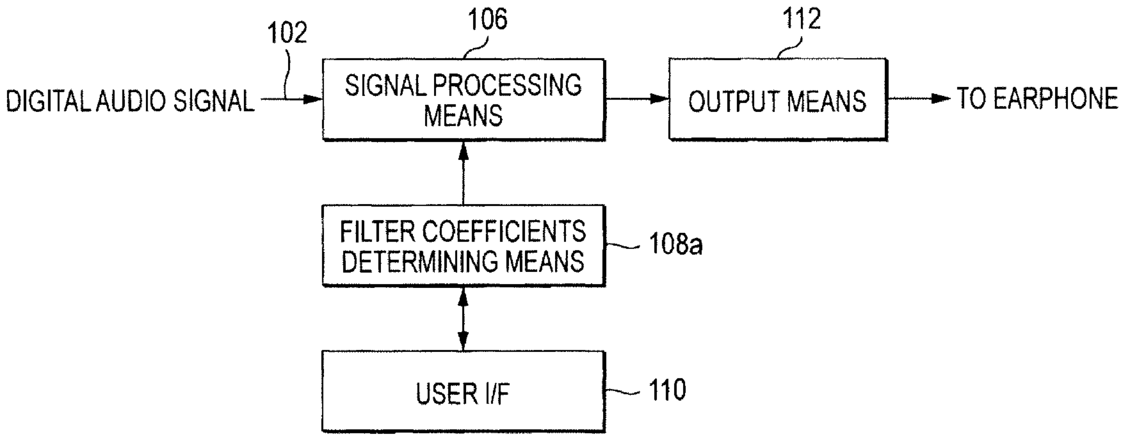
FIG. 9 is a block diagram showing an audio signal compensation device according to a second embodiment of the invention.

The second embodiment is different from the first embodiment in that, instead of holding filter coefficients, as shown in FIG. 9, a filter coefficients determining means 108*a* determines a frequency characteristic of a filter for suppressing a first-order resonance phenomenon and a higher-order resonance phenomenon than the first-order one such as second-order resonance. The filter coefficients determining means 108*a* derives filter coefficients according to the determined frequency characteristic and outputs the derived filter coefficients to the signal processing means 106. The signal processing means 106 performs filtering on an audio signal using the thus-set filter coefficients. Signals for listening are output to the earphones via the output means 112.

The second embodiment can make the capacity of the memory for holding filter coefficients smaller than in the first embodiment. When necessary, filter coefficients can be calculated more accurately.

Third Embodiment

A third embodiment of the invention will be described below with reference to FIGS. 2-8 and 1 or 9. Description of a part having the same one in the first or second embodiment will be omitted.

In the third embodiment, a filter that compensates for first-order resonance and second-order resonance simultaneously may be generated and a user may be caused to listen to a resulting sample sound. For example, a filter that compensates for first-order resonance at 7 kHz and second-order resonance at 12 kHz is generated. It is expected that the third embodiment provides an advantage of reducing the number of times of trial listening.

The embodiments provide an advantage of allowing a user to enjoy high-quality sounds by lowering the degree of sound muffling due to closed space resonance that occurs when the user is wearing earphones, without requiring any hardware for measurement.

The embodiments make it possible to select a suitable acoustic correction filter by a method that is simple to a user. That is, the embodiments make it possible to implement an acoustic device capable of suppressing sound muffling by compensating for the resonance phenomena that are due to closure of the external auditory canals and vary from one person to another while decreasing the number of filter coefficients to be prepared.

Important Features of Embodiments (1) An audio signal compensation device having a function of causing a user to listen to a sound through an earphone, the audio signal compensation device comprising: digital signal processing means for performing, on an input audio signal, filtering for suppressing peaking phenomena at particular frequencies due to resonance that occurs when an external auditory canal is closed by the earphone worn; filter coefficients storage means for storing multiple filter coefficients; and filter coefficients determining means for determining a set of filter coefficients to be used by the digital signal processing means from among the multiple filter coefficients stored in the filter coefficients storage means, wherein the options for the determination of filter coefficients are produced by selecting a first filter coefficient and a second filter coefficient from the plurality of filter coefficients, the first filter coefficient corresponding to a first characteristic quantity of external auditory canal characteristics, the second filter coefficient corresponding to a second characteristic quantity of the external auditory canal characteristics which is predicted based on the first characteristic quantity.

(2) The audio signal compensation device according to item (1), wherein the one characteristic quantity corresponds to a characteristic of one of a left ear and a right ear of the user and the remaining characteristic quantity corresponds to a characteristic of the other of the left ear and the right ear.

(3) The audio signal compensation device according to item (1), wherein the certain characteristic quantity includes a first-order resonance frequency and the remaining characteristic quantity includes at least one of a second-order resonance frequency and a higher-order resonance frequency than the second-order resonance frequency.

(4) The audio signal compensation device according to any one of items (1) to (3), wherein the multiple filter coefficients stored in the filter coefficients storage means are determined based on characteristics acquired from a plurality of human beings.

(5) An audio signal compensation device which is different from the audio signal compensation device according to any one of items (1) to (4), comprising: filter coefficients generating means instead of the filter coefficients storage means and the filter coefficients determining means.

The most essential feature of the embodiments is that a set of filter coefficients is determined by selecting a first filter coefficient and a second filter coefficient from the multiple filter coefficients, the first filter coefficient corresponding to a first characteristic quantity of external auditory canal characteristics, the second filter coefficient corresponding to a second characteristic quantity of the external auditory canal characteristics which is predicted based on the first characteristic quantity.

While certain embodiments have been described, these embodiments a have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An audio signal correcting device comprising:

a signal processor configured to perform filtering on an input audio signal;

a filter coefficients storage module configured to store a plurality of filter coefficients therein;

a filter coefficient determining module configured to determine a filter coefficient among the plurality of filter coefficients stored in the filter coefficients storage module;

a user interface configured to provide options for a determination of the filter coefficient to a user so as to obtain a selection result from the user, wherein the filter coefficients determining module determines the filter coefficient by predicting a second-order resonance frequency from a first-order resonance frequency of an acoustic characteristic of an external auditory canal, wherein the second-order resonance frequency is less than twice as much as the first-order resonance frequency.

2. The device according to claim 1, wherein the plurality of filter coefficients stored in the filter coefficients storage module are determined based on characteristics acquired from a plurality of human beings.

3. The device according to claim 1, further comprising:

an earphone configured to allow the user to listen to a sound based on the audio signal output from the signal processor.

4. The device according to claim 2, further comprising:

an earphone configured to allow the user to listen to a sound based on the audio signal output from the signal processor.

5. An audio signal correcting device comprising:

a signal processor configured to perform filtering on an input audio signal;

a filter coefficient generator configured to generate a filter coefficient used in the signal processor;

a user interface configured to provide options for a determination of the filter coefficient to a user so as to obtain a selection result from the user;

wherein the filter coefficient generator generates the filter coefficient by predicting a second-order resonance frequency from a first-order resonance frequency of an acoustic characteristic of an external auditory canal, wherein the second-order resonance frequency is less than twice as much as the first-order resonance frequency.

6. The device according to claim 5, further comprising:

an earphone configured to allow the user to listen to a sound based on the audio signal output from the signal processor.

7. An audio signal correcting method which is performed by an audio signal correcting device, the method comprising:

a selecting step in which a selecting module selects a first-order resonance frequency relating to a particular frequency of an external auditory canal characteristic based on an external instruction;

a filter generating step in which a filter generating module generates a filter by predicting a second-order resonance frequency from the selected first-order resonance frequency, wherein the second-order resonance frequency is less than twice as much as the first-order resonance frequency; and a filter processing step in which signal processor performs a filtering process on an audio signal so as to reduce the particular frequency, when the signal processor receives the audio signal and corrects the received audio signal.

8. The device according to claim 1, wherein the second-order resonance frequency is greater than the first-order resonance frequency.

9. The device according to claim 5, wherein the second-order resonance frequency is greater than the first-order resonance frequency.

10. The method according to claim 7, wherein the second-order resonance frequency is greater than the first-order resonance frequency.

* * * * *